July 18, 1967 P. D. FROST 3,331,120
PROCESS FOR COMPOSITE METAL SHAPES
Filed Nov. 25, 1964
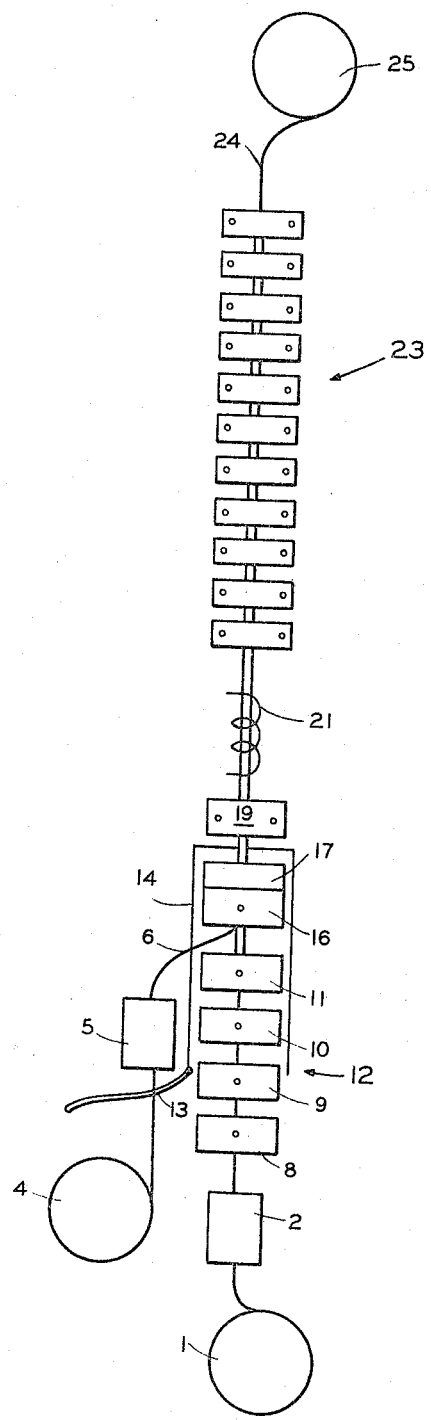
INVENTOR.
PAUL D. FROST
BY GRAY, MASE, & DUNSON
ATTORNEYS
BY William J Mase

United States Patent Office 3,331,120
Patented July 18, 1967

3,331,120
PROCESS FOR COMPOSITE METAL SHAPES
Paul D. Frost, Columbus, Ohio, assignor to The Battelle Development Corporation, Columbus, Ohio, a corporation of Delaware
Filed Nov. 25, 1964, Ser. No. 413,853
3 Claims. (Cl. 29—471.7)

This invention relates to the production of composite metal shapes. More particularly, it relates to a unique method for producing composite metal shapes wherein a sheath is roll formed and welded around a core material and subsequently bonded to the core material in a continuous process.

Historically, many varied processes have been used for the manufacture of composite metal shapes. The desirability of employing beneficial characteristics of each metal in a multimetallic structure have been obvious. To this end, processes comprising solid-state bonding or the casting of one metal about another have been employed. A solid-state bonding process that has met with some success in the past is that wherein a thick slab of core alloy is heated while being confined within a "sandwich" of thinner cladding alloy whereupon the composite assembly is rolled to bond the metallurgical interfaces. The core material may be encapsulated within a "picture frame" comprised of top and bottom plates of cladding material. For the case of reactive metals, an inert atmosphere or vacuum may be imposed within the "picture frame." The large amount of breakdown required has resulted in some disadvantage. Continued rolling results in the formation of brittle intermetallic compounds at the metallurgical interfaces. These factors have limited "sandwich" rolling to plate and sheet rather than to rod and wire products. Similar roll-bonding techniques have been carried out at lower temperatures wherein a composite package is given a large reduction in a single pass. The highly cold worked components are then softened and the bond is enhanced by diffusion at the metallurgical interfaces in an annealing step. Both roll-bonding processes are limited in their suitability for production of generally round shapes because there is no way to bond the edges.

Other semicontinuous processes have been attempted in the past for the production of generally round composite shapes such as rod or wire. In one case, a core material is inserted within a tubular shape of cladding alloy. The composite tubular assembly is then rolled to produce a bonded structure. In still another process, a length of tubular composite is fabricated by welding cladding alloy around a core alloy. Both of the above-mentioned processes are limited by not being adaptable to continuous processing.

A continuous process that has met with some success is that process wherein a powder is compacted at high pressure and temperature around the surface of a core rod and the composite is subsequently drawn into wire. This process is limited to generally nonreactive powders and to cases where cladding materials can be obtained economically in powder form.

It has been discovered that a process can be provided wherein composite metal shapes can be produced by solid-state bonding without the disadvantages inherent in previous processes. The economics of the production of composite rod can be improved considerably over that heretofore obtainable by continuously enclosing a core rod within a sheath of cladding metal and continuously hot rolling the composite to bond the sheath and core portions thereof. A wide range of cladding metals and thicknesses of cladding metals are amenable to the method of the process. In addition, the product can be made in a variety of cross-sectional shapes such as rounds, rectangles, triangles, and sections of low symmetry. It has been found that a satisfactory method for continuously enclosing a core rod within a sheath is by means of a high frequency welding current applied at the abutting edges of a sheath continuously assuming a tubular shape. Well known rapid heating means such as induction heating are satisfactory to raise the temperature of the formed composite just prior to its entrance into pressure applying means which latter means effect the final bonding and reduce the product to final size.

One of the objects of this invention is to provide an improved process for the production of composite metal shapes.

Another object of this invention is to provide an improved continuous process for the production of composite metal shapes.

Still another object of this invention is to provide an improved continuous process for the production of composite metal shapes wherein reactive metals can be satisfactorily bonded.

Yet another object of this invention is to provide an improved continuous process for the production of composite metal shapes wherein products of a wide variety of closely controlled dimensions can be obtained.

Another object of this invention is to provide an improved continuous process for the production of composite metal shapes wherein the metallurgical bond is substantially free from brittle intermetallic compounds.

Various other objects will appear from the following description of and embodiment of the invention, and the novel features will be particularly pointed out hereinafter in connection with the appended claims.

Briefly described, this invention includes in its scope a process for the continuous production of composite metal shapes comprising the steps of forming a clean flat metal strip to approach tubular cross section, introducing a core rod into the partially formed strip, welding the opposing edges of the sheathing strip to form a longitudinal seam which extends parallel to the axis of the core rod, passing the core and sheath thus formed through several sizing rolls to bring the components into a tight fitting composite, rapidly heating the tight fitting composite and passing the heated composite to a mill which simultaneously rolls, reduces, and stretches the composite, thus bonding the sheath to the core.

The improved method of forming composite metal shapes will be come more apparent from the following description of one embodiment and the accompanying drawing.

In the drawing:

The single figure illustrates diagrammatically an apparatus carrying out the process of this invention. The diagrammatic illustration is shown as the process is carried out on known types of apparatus.

In the embodiment of the invention illustrated in the drawing, the apparatus for carrying out he method of this process comprises generally forming rolls 8, 9, 10, 11, final forming roll 16, tube welder 17, heater 21 and roll bonding means 23. In a typical operation, strip from coil 1 which will eventually form the clad metal is fed to cleaning station 2.

The thickness of the fed strip will depend on the reduction given to the product and the thickness of clad desired on the final product. Cleaning station 2 is provided with facilities for degreasing, descaling, and where desired, grit blasting the paid off metal strip. As the cleaned strip exits from cleaning station 2, it is fed to multiple-stand roll-forming mill 12 which comprises a series of horizontal rolls followed by alternate vertical and horizontal rolls. The upper rolls are adjusted so that the strip is first shaped into a shallow U shape which progressively becomes deeper or tubular in shape. The partially formed tubular shape which exits from forming roll 11 has an open seam sufficiently large to allow for convenient insertion of a core rod 6 which has passed through cleaning station 5 from coil 4 separate from cleaning station 2 used for strip 1. Core rod 6 is hot rolled and pickled or cold drawn, depending on the tolerances and concentricity required in the finished product.

The interior of the partially formed tube and the entering core rod may be protected by a reducing atmosphere. A nonoxidizing gas is introduced at 13 into the partially formed tube and continues to protect the composite assembly within 14 until the edges of the partially formed tube are closed around the core rod. The partially formed tubular section confining core rod 6 enters the final stand of rolls 16 where the sides of the partially formed tubular section are bent around the core rod so that only a small opening remains where the strip edges nearly abut. The composite assembly formed at the final forming roll passes to welder 17. The specific welding apparatus is not part of the present invention, however it has been found that some welding processes are more suitable than others. Conventional welding processes such as low frequency resistance or arc welding used to weld tubular shapes cause the formation of a heavy inner bead which prevents subsequent bonding of the tube to the core. In addition, conventional frequency welding is not capable of welding tubing of high conductivity metals such as copper. A satisfactory method that can be used to minimize bead size and can be adapted to all metals that might comprise the outer sheath of the composite assembly is high-frequency resistance welding. The high-frequency welding operation is carried out as the strip passes through the final forming roll 16. In these rolls, a small angle is formed at the open seam with the weld joint as the apex and the two edges of the strip as the sides. A high-frequency current is introduced by means of a pair of contacts at the edges of the strip just in advance of the final forming rolls. The current flow between contacts takes the path of least inductance, which is the two legs of the angle, thus heating the two edges and welding them together at the apex. In this way the tubular component is closed around the core rod without any welding of the tubular component to the core rod.

Welding processes such as plasma welding, laser welding or other new processes may be found as suitable as the hereinabove described high-frequency resistance welding.

Any external bead formed on the outer tube can be removed by a trimmer having suitable cutting means and located just subsequent to the welding station 17. The composite assembly then passes through sizing roll stands 19. This results in cold-forming the inner core rod and outer closed tubular shape into a tight-fitting composite. The sized composite then passes to rapid heating means 21. This step is necessary to prepare the composite for deformation and solid-state bonding in the rolling operation that follows. The exact temperature to which the tubular shell and core material must be heated would vary with the shell and core materials used. High-frequency induction heating is a satisfactory means for heating the tight-fitting composite. The heated composite passes to tandem rod mill 23 which simultaneously bonds, rolls and stretches the core to the sheath and reduces the cross-sectional area to as little as $\frac{3}{16}$-inch diameter. The three-roll tandem rod-finishing mill 23 is similar to that presently being used for stretch-reducing of tubular products. The continuous wire-rod-finishing rolling mill 23 from which the final product is withdrawn provides the advantages and simplicity of modern rod mills and the additional advantages of freedom from twisting, and closer tolerances than are possible in most finishing rod mills. In the design of the three-roll tandem rod-finishing mill, the finishing mill train has been extended to 11 or more stands. A simple, group-drive using A.-C. power can be used for carbon steel. A more complex drive may be desirable for alloy steel. Successive stands are arranged in a staggered manner 180 degrees apart so that the rod does not have to be twisted between stands. Each stand has three rolls arranged radially 120 degrees to each other. The tolerances of the finished product are ±0.004 inch with a maximum out-of-round of 0.004 inch. In the single-drive mill the rolls are nonadjustable and therefore do not require great skill on the part of the rolling crew. This is made possible by a specially designed roll-pass dressing machine. The mill is also equipped with a stand-changing device that permits converting to a different rolling program in a few minutes. The maximum rolling speed for wire diameters between about 0.192 inch to ¼ inch is approximately 6000 feet per minute. The mill can accommodate round rod or hexagonal sections. The three rolls per stand have a diameter of about 11 inches. For carbon steel rolling the rolls are connected with each other by bevel gears, necessitating only one drive per stand. However, for alloy steels three drive shafts per stand are desirable.

The bonded composite product 24 is taken from finishing mill 23 and coiled as at 25.

In another embodiment, the composite assembly emerging from heater 21 is passed through several rolling stands to produce only enough reduction as to bond the sheath to the core as opposed to the more complete reduction described in the above-mentioned embodiment. The bonded composite is coiled as it emerges from the forming-welding-bonding lines. Coils produced from several of these lines are then re-heated and fed to a conventional rod mill. These conventional rod mills are geared to a high-tonnage production and can handle the output of several forming-welding bonding lines of this invention. The exact number of lines that could be handled by a single rod mill depends on the starting and finishing sizes of the composites being produced. For example, a large diameter (e.g., 2 to 4 inches) bonded composite can be fed directly into a rod mill from the forming-welding-bonding line and reduced to final size. Where bonded composites of smaller cross-sectional area are used as starting material, a small rod mill would require the product of several of the lines of this invention.

In still another embodiment, the bonded product of the forming-welding-bonding line is drawn on bull-blocks and finally on conventional wire-drawing frames equipped with several wire-drawing blocks.

In another embodiment of the invention the final composite product is recycled and used as core rod for still another composite assembly. The product is made to enter a different metal sheath during the forming stage of the invention. In this way, a rod having numerous different metal layers can be produced.

The above embodiments are intended to be illustrative of the method of the process but are not intended to be limiting thereof. The embodiments described hereinabove do illustrate that a novel and unique method for producing composite metal shapes is provided wherein a core material is encapsulated on all sides by a cladding material and is roll bonded and reduced to controlled dimensions in a continuous process.

One advantage of this invention is that a process is provided for production of composite metal shapes wherein the product may have any desired ratio of cladding thickness to core thickness.

Another advantage of this invention is that a process is provided for production of composite metal shapes wherein the reduction of the composite may be carried out in stages without the necessity for a large initial break-down or reduction.

Still another advantage of this invention is that a process is provided for production of composite metal shapes wherein a welded shape having little or no inside weld bead is bonded by solid-state bonding to a core material.

Yet another advantage of this invention is that a process is provided for production of composite metal shapes wherein composites are produced without the formation of brittle intermetallic compounds at the bonded interfaces.

Many other uses and advantages for the method of this process will be apparent to those having a need for an improved process for the production of composite metal shapes. Without the described improvements, the number of applications in which the desirable characteristics of two different metals can be employed in a single bonded composite metal structure would be severely limited.

It will be apparent that new and useful methods of producing composite metal shapes have been described. It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:
1. A continuous method for producing composite metal shapes comprising:
   (a) conducting an elongated strip of a cladding metal through means disposed to continuously bring its edges together to form an enclosure;
   (b) conducting a complementary shaped elongated rod into said enclosure as it is formed;
   (c) welding the edges of said strip to complete enclosure of said rod continuously by introducing high-frequency welding current through electrode contacts at each opposing marginal edge to heat and fuse the edges of the folded strip as said edges are brought into abutting relationship;
   (d) heating said composite strip and rod assembly to a temperature amenable to deformation and solid-state bonding; and
   (e) simultaneously stretching and compressing said composite strip and rod assembly to effect solid-state bonding of said strip to said rod.
2. The method of claim 1 wherein said simultaneous stretching and compressing is effected by a three-roll tandem rod mill.
3. The method of claim 1 wherein said welding and solid-state bonding is effected in a nonoxidizing environment.

References Cited
UNITED STATES PATENTS

| | | | |
|---|---|---|---|
| 2,857,503 | 10/1958 | Rubb et al. | 219—67 X |
| 2,947,078 | 8/1960 | Pflumm et al. | 29—497.5 X |
| 3,015,018 | 12/1961 | Rubb | 219—67 |
| 3,154,846 | 11/1964 | Alexander | 29—474.1 X |
| 3,220,107 | 11/1965 | Clark | 29—497.5 X |

JOHN F. CAMPBELL, *Primary Examiner.*

L. J. WESTFALL, *Assistant Examiner.*